(12) United States Patent
Regan et al.

(10) Patent No.: US 12,346,620 B1
(45) Date of Patent: Jul. 1, 2025

(54) DEVICE AND METHOD FOR DISPLAY SCREEN CONTROL USING TWO PROCESSORS

(71) Applicant: MOTOROLA SOLUTIONS, INC., Chicago, IL (US)

(72) Inventors: Sean Regan, Delray Beach, FL (US); Daniela Stankovska, Fort Lauderdale, FL (US); Kevin D. Elliott, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/398,683

(22) Filed: Dec. 28, 2023

(51) Int. Cl.
*G06F 3/14* (2006.01)
*G06F 3/041* (2006.01)
*G06F 9/4401* (2018.01)
*H04B 1/3827* (2015.01)

(52) U.S. Cl.
CPC .............. *G06F 3/14* (2013.01); *G06F 3/0416* (2013.01); *G06F 9/4418* (2013.01); *H04B 1/3833* (2013.01)

(58) Field of Classification Search
None
See application file for complete search history.

(56) References Cited

U.S. PATENT DOCUMENTS

| | | | |
|---|---|---|---|
| 8,874,097 B1 | 10/2014 | Warsaw et al. | |
| 10,691,391 B2 | 6/2020 | Singh et al. | |
| 10,901,479 B1 | 1/2021 | Boerger et al. | |
| 11,481,225 B2 | 10/2022 | Pinder et al. | |
| 2017/0075696 A1* | 3/2017 | Pinder | G06F 3/0482 |

FOREIGN PATENT DOCUMENTS

| | | |
|---|---|---|
| CN | 207780714 U | 8/2018 |
| CN | 210324144 U | 4/2020 |

* cited by examiner

*Primary Examiner* — Brian M Butcher
(74) *Attorney, Agent, or Firm* — PERYY + CURRIER INC.

(57) ABSTRACT

A communication device comprises: a communication interface; a display screen; a first processor configured to power up according to a first power-up time, the first processor for implementing radio functionality associated with the communication interface; and a second processor configured to power up according to a second power-up time longer than the first power-up time, the second processor for implementing extended functionality as compared to the first processor. The first processor, after the first power-up time: controls the display screen to provide a first GUI displaying communication interface-related information and a power-up status of the second processor; and after the second power-up time, hand off control of the display screen to the second processor. The second processor, after being provided with control of the display screen: controls the display screen to provide a second GUI displaying the communication interface-related information and information associated with the extended functionality.

21 Claims, 8 Drawing Sheets

DEVICE AND METHOD FOR DISPLAY SCREEN CONTROL USING TWO PROCESSORS

BACKGROUND OF THE INVENTION

Communication devices for first responders, such as land-mobile radios (LMRs), may be configured to provide certain critical information as soon as possible after power up. However, such communication devices may generally be controlled by processors that may have long power-up times (e.g. 30 to 40 seconds), leading to such critical information being unavailable for such a period of time.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
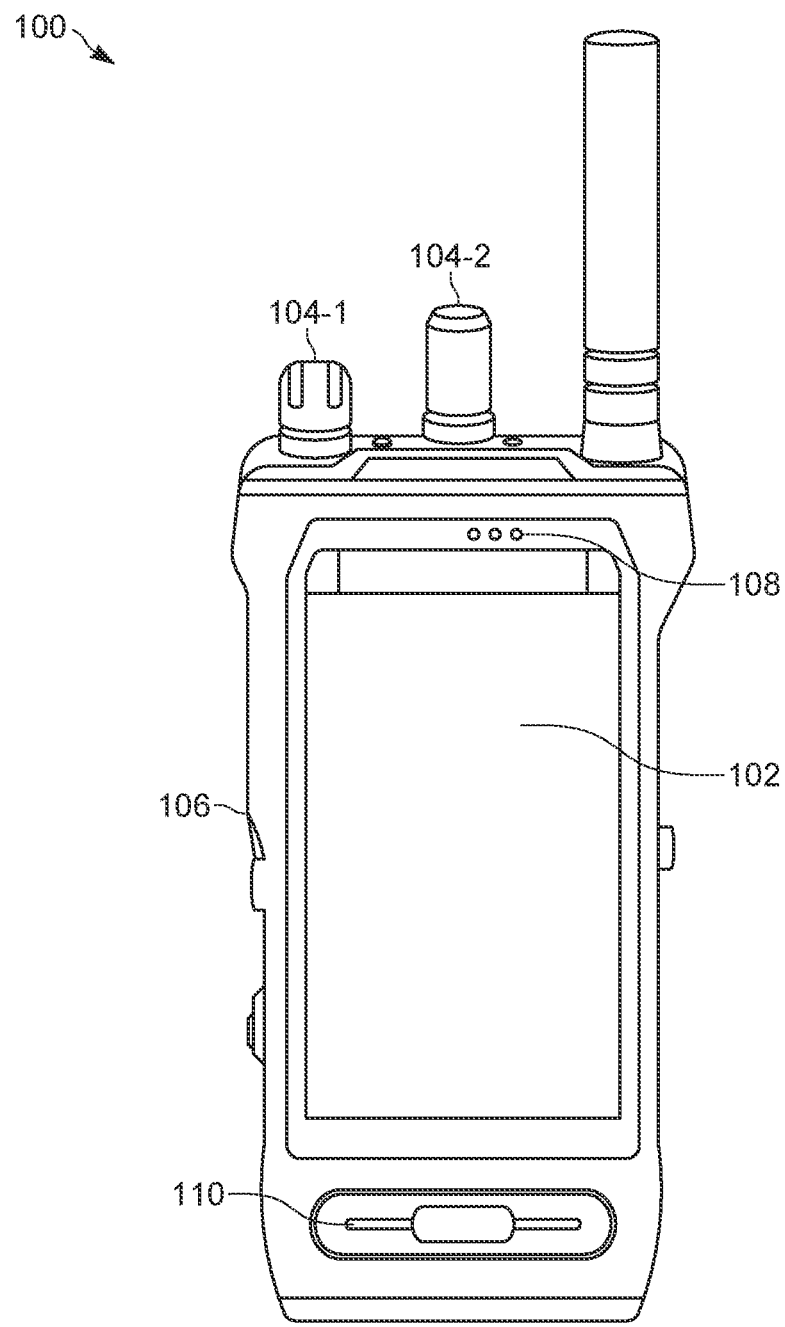
FIG. 1 is a communication device for display screen control using two processors, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In order to quickly respond to public safety incidents, and the like, communication devices of first responders (e.g. police officers, fire fighters, emergency medical technicians, security guards, and the like), certain critical information may be provided as soon as possible after power up. However, when only one processor is used to implement functionality of such a communication device, including, for example, implementing radio functionality, and operating system functionality, such a processor generally has long power-up times, which may lead to the aforementioned critical information being unavailable for such a period of time. Reducing time for providing such critical information may be challenging however.

Thus, there exists a need for an improved technical method, device, and system for display screen control using two processors.

An aspect of the present specification provides a communication device comprising: a communication interface; a display screen; a first processor configured to power up according to a first power-up time, the first processor for implementing radio functionality associated with the communication interface; and a second processor configured to power up according to a second power-up time longer than the first power-up time, the second processor for implementing extended functionality as compared to the first processor, the first processor further configured to, after the first power-up time: control the display screen to provide a first graphic user interface programmed to display communication interface-related information and a power-up status of the second processor; and after the second power-up time, hand off control of the display screen to the second processor; and the second processor further configured to, after being provided with control of the display screen: control the display screen to provide a second graphic user interface programmed to display the communication interface-related information and information associated with the extended functionality Another aspect of the present specification provides a method comprising: a first processor of a communication device, after first power-up time of the first processor controlling a display screen of the communication device to provide a first graphic user interface programmed to display communication interface-related information and a power-up status of a second processor of the communication device, the first processor configured to power up according to the first power-up time, the first processor for implementing radio functionality associated with a communication interface of the communication interface, and the second processor configured to power up according to a second power-up time longer than the first power-up time, the second processor for implementing extended functionality as compared to the first processor; the first processor, after the second power-up time, handing off control of the display screen to the second processor; and the second processor, after being provided with control of the display screen controlling the display screen to provide a second graphic user interface programmed to display the communication interface-related information and information associated with the extended functionality.

Each of the above-mentioned embodiments will be discussed in more detail below, starting with example system and device architectures of the system in which the embodiments may be practiced, followed by an illustration of processing blocks for achieving an improved technical method, device, and system for display screen control using two processors.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

Further advantages and features consistent with this disclosure will be set forth in the following detailed description, with reference to the drawings.

Attention is directed to FIG. 1, which depicts a perspective view of a communication device 100 for display screen control using two processors.

As depicted, the communication device 100 comprises a display screen 102, a first input device 104-1, and a second input device 104-2.

The first input device 104-1 (e.g., as depicted, a button and/or knob) may be for one or both of turning on the communication device 100 and controlling volume of the communication device 100. Hence, the first input device 104-1 may generally comprise a combination of an on-switch and a volume control component, though such functionality may be provided via different input devices. Put another way, the communication device 100 may comprise a dedicated on-switch and a separate dedicated volume knob.

The second input device 104-2 (e.g., as depicted, a button and/or knob) may be for controlling a channel and/or zone used by the communication device 100 to communicate using radio operations. For example, turning the knob of the second input device 104-2 may enable a user of the communication device 100 to select a zone (e.g. from a plurality of zones), and then select a channel from a selected zone, as discussed in more detail herein.

The input devices 104-1, 104-2 are interchangeably referred to hereafter, collectively, as the input devices 104, and, generically, as an input device 104. The communication device 100 may include other suitable input devices, such as a push-to-talk (PTT) button 106.

For example, the communication device 100 may provide radio communications (e.g. to communicate with other communication devices) using radio channels, and a channel over which the communication device 100 is communicating may be selectable using the second input device 104-2. Furthermore, the channels may be logically organized into groups, which may be interchangeably referred to as zones. Hence, a user, such as a first responder, operating the communication device 100 may turn on the communication device 100 by operating the first input device 104-1, and operate the first input device 104-1 to control volume of a speaker 108 of the communication device 100. The user may operate the second input device 104-2 to first select a zone (e.g. from a plurality of zones) that includes a plurality of respective channels, and then select a channel from the plurality of respective channels of the zone over which the communication device 100 is to be used to communicate. The user may operate the PTT button 106 and speak into a microphone 110 of the communication device 100 to transmit audio data over the selected channel. The speaker 108 may emit audio received via the selected channel.

Hence, especially in critical incidents (e.g. police incidents, fire incidents, emergency medical incidents) it may be critical that radio and/or communication interface-related information be available at the communication device 100 as soon as possible after powering up the communication device 100 so that a user (e.g. a first responder) operating the communication device 100 may not only use the communication device 100 to communicate, but also be provided with information such as a selected channel (and/or a selected zone) over which the communication device 100 is communicating, and a volume to which the speaker 108 has been controlled. For example, if the volume is too low, the user may not hear audio from the speaker 108 and, if the user is unaware of the volume, the user may not know to increase the volume (e.g. using the first input device 104-1). Similarly, while radio functionality may be available, if the user does not know the channel over which the communication device 100 is communicating, the user may be communicating over a channel to which no one (or at least no relevant first responders) is listening to.

While control of the communication device 100 is described with respect to the input devices 104, and PTT button 106 in the form of buttons and/or knobs, the communication device 100 may include any suitable combination of input devices of any suitable type, and that may or may not include the exact arrangement of the depicted buttons and/or knobs.

As depicted in FIG. 1, the communication device 100 may comprises a mobile radio adapted for use by first responders, and the like, and more specifically a land mobile radio (LMR), a digital mobile radio (DMR), a two-way radio, a first responder radio, and the like, amongst other possibilities, and/or any other suitable communication device for assisting first responders in responding to incidents.

However, the communication device 100 may comprise any suitable portable device, partially portable device, and/or non-portable device. In particular examples, the communication device 100 may comprise any suitable mobile communication device, any suitable portable device, cell phone, a radio, a body-worn camera (e.g., with audio functionality), a remote speaker microphone (RSM), a first responder device, a laptop computer, and the like, and/or any device that includes a display screen and a communication interface, as described herein. Depending on a configuration of the communication device 100, the PTT button 106 may be optional.

Figure 2:
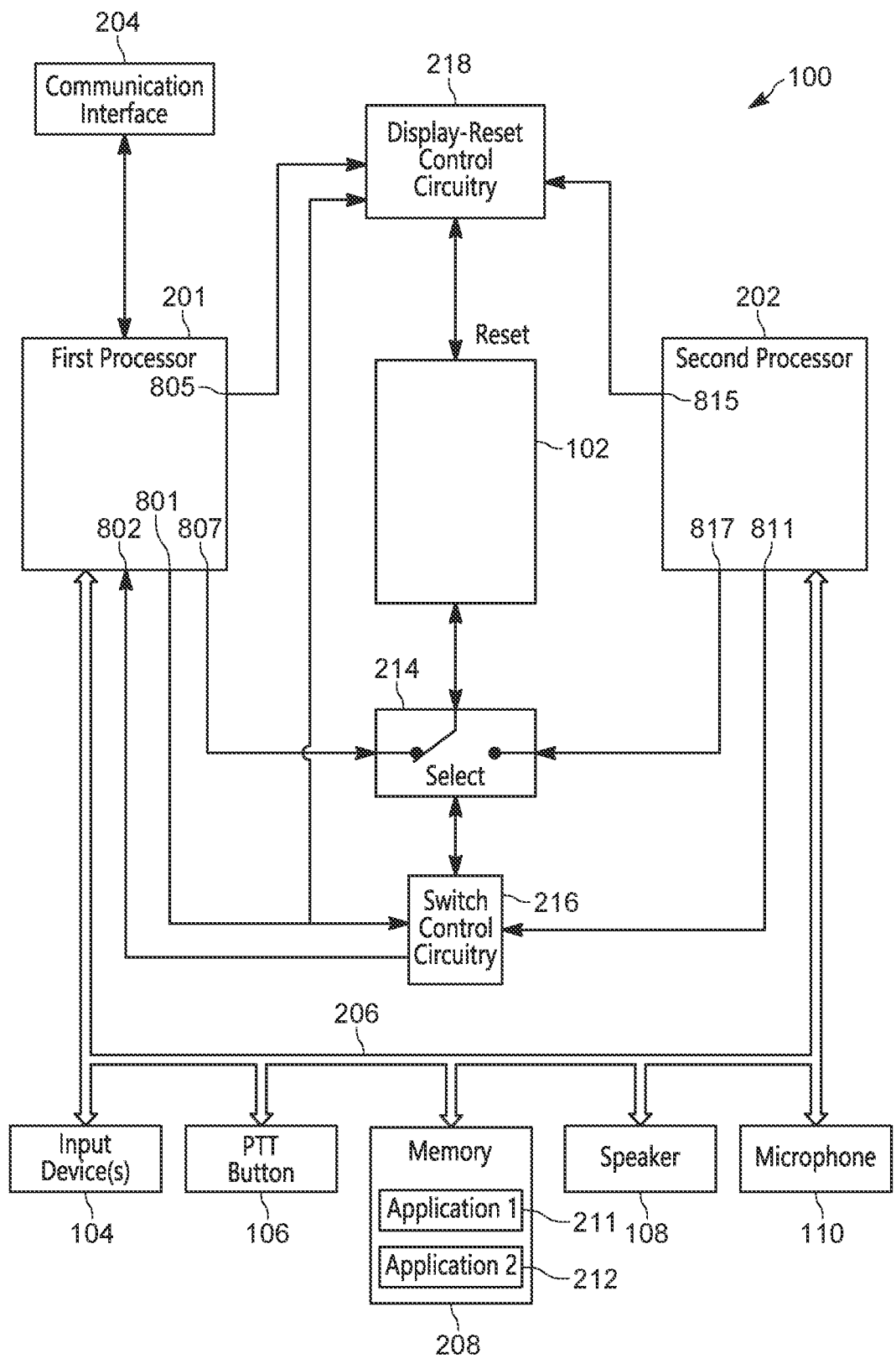
FIG. 2 is a device diagram showing a device structure of the communication device for display screen control using two processors, in accordance with some examples.

Attention is directed to FIG. 2, which depicts a block diagram of the communication device 100. Communication links between components of the communication device 100 are depicted in FIG. 2 as arrows, with directionality of audio and/or data flow indicated by directionality of the arrows, though directionality may be in any suitable direction.

With reference to FIG. 2, the communication device 100 comprises: the display screen 102, the input devices 104, the PTT button 106, the speaker 108 and the microphone 110.

As depicted, the communication device 100 further comprises a first processor 201, a second processor 202, and a communication interface 204. The first processor 201 and the second processor 202 are communicatively coupled via a communication bus 206, over which the processors 201, 202 may exchange data. The communication bus 206 is depicted as a line heavier than other communication links of the communication device 100, to distinguish between the communication bus 206 and the other communication links. Other types of processor interconnections are possible as well.

Indeed, as depicted, the input devices 104, the PTT button 106, the speaker 108 and the microphone 110 are also communicatively coupled with the processors 201, 202 via the communication bus 206.

As depicted, the communication device 100 further comprises a memory 208 storing a first application 211 (e.g. "Application1), and a second application 212 (e.g. "Application2), that are respectively processable by the processors 201, 202 to implement certain functionality as described herein.

While only one memory 208 is depicted, in other examples, the communication device 100 may comprise two (or more) memories 208, respectively storing the first application 211 and the second application 212, for example one memory 208 for each processor 201, 202. Put another way, the communication device 100 may comprise respective memories 208 for each processor 201, 202, and/or respective memories 208 dedicated to each processor 201, 202.

The memory 208 may comprise any suitable combination of read-only memory (ROM), random-access memory (RAM).

The memory 208 may generally comprise a non-transitory machine readable medium that stores machine readable instructions to implement one or more programs or applications and/or program code. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the communication device 100 as described herein are maintained, persistently, at the memory 208 and used by the processors 201, 202, which makes appropriate utilization of volatile storage during the execution of such programming instructions.

Figure 3:
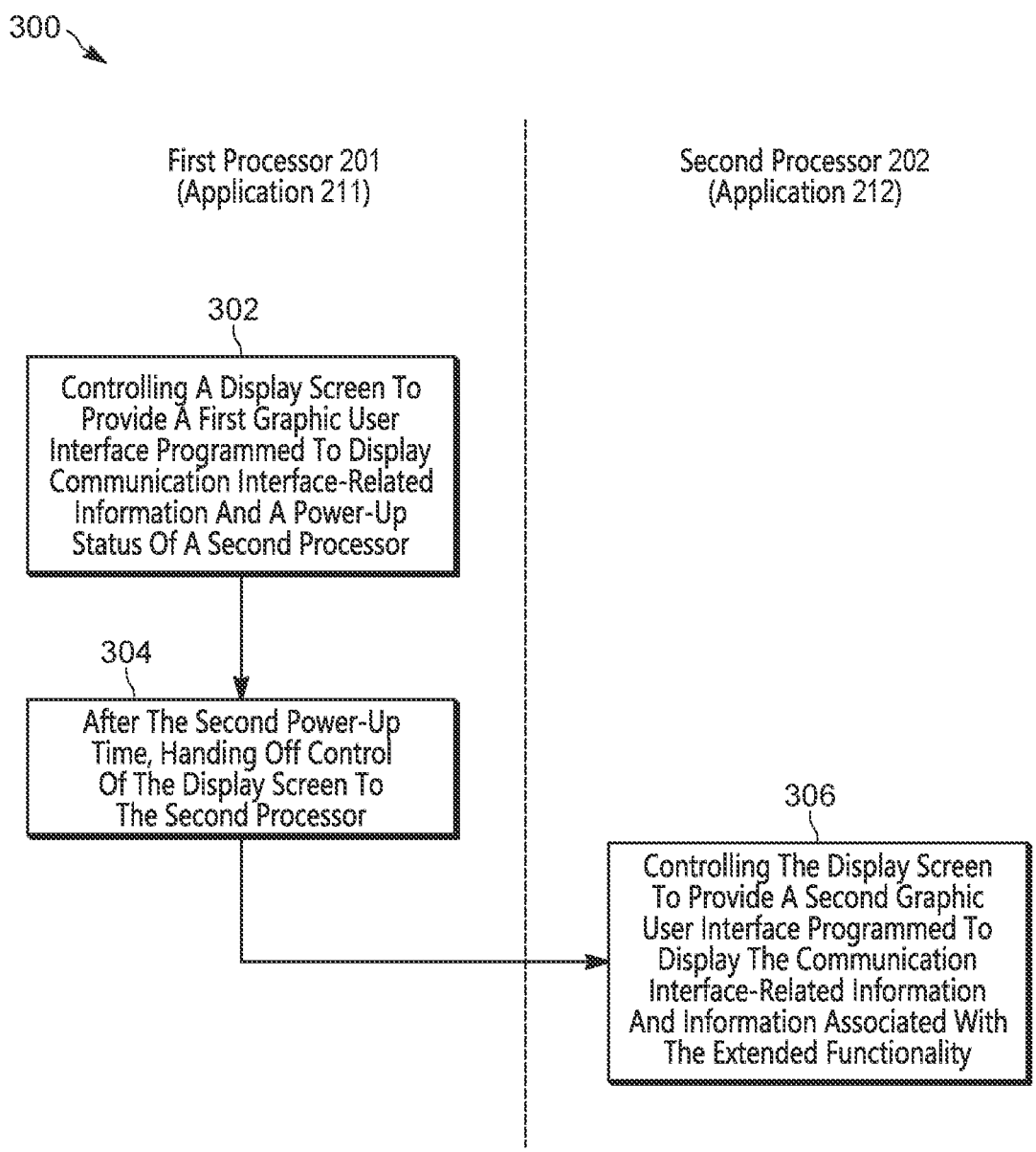
FIG. 3 is a flowchart of a method for display screen control using two processors, in accordance with some examples.

In particular, the memory 208 may comprise a (e.g. non-transitory) computer-readable storage medium having stored thereon program instructions corresponding to the applications 211, 212 that, when executed by the processors 201, 202, cause the processors 201, 202 to perform respective sets of operations comprising the blocks of the method of FIG. 3.

The communication interface 204, generally comprises one or more transceivers that may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3$^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the communication interface 204 may comprise one or more transceivers that may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication interface 204 may optionally further include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The communication interface 204 may optionally be configured to communicate via a Controller Area Network (CAN), and hence may include a CAN transceiver.

The communication interface 204 may further include any suitable combination of one or more modulators, one or more demodulators (and the one or more modulators, one or more demodulators may be combined), one or more wired and/or wireless input/output (I/O) interfaces (e.g. that are configurable to communicate with other communication devices and/or base stations, and the like, not depicted).

Returning to the processors 201, 202, the processors 201, 202 may include one or more respective logic circuits, one or more processors, one or more respective microprocessors, and the like, and/or the processors 201, 202 may include one or more respective ASIC (application-specific integrated circuits) and one or more respective FPGA (field-programmable gate arrays), and/or another electronic device. The processors 201, 202 may include ports (e.g., hardware ports) for coupling to other suitable hardware components.

In particular, the first processor 201 is understood to power up according to a first power-up time, and the first processor 201 is further understood to implement radio functionality associated with the communication interface 204. In some examples, the first processor 201 may comprise a digital signal processor (DSP).

In contrast, the second processor 202 is understood to power up according to a second power-up time longer than the first power-up time, and the second processor 202 is further understood to implement extended functionality as compared to the first processor 201. For example, the second power-up time may be 30 seconds, 35 seconds, 40 seconds, amongst other possibilities, and the first power-up time may be 5 seconds, 10 seconds, 15 seconds, amongst other possibilities.

Furthermore, it is understood that the communication device 100 further comprises an on-switch (e.g. the first input device 104-1), and the first power-up time (e.g. of the first processor 201) and the second power-up time (e.g. of the second processor 202) may begin after the on-switch is actuated to an on-state (e.g. the processors 201, 202 begin to power up (e.g. boot up) when an on-switch of the communication device 100 is turned on).

Indeed, while not depicted, the communication device 100 is understood to comprise a battery and/or a power cell, and the like, and the on-switch being actuated to an on-state (e.g. by a user of the communication device 100) causes power to be provided from the battery and/or a power cell to the processors 201, 202 to cause the processors 201, 202 begin powering up and/or begin booting up.

The first processor 201 may be dedicated to processing radio data transmitted or received over the communication interface 204, and may control volume of audio output by the speaker 108; hence, the first processor 201 is understood to have access to a selected channel currently being used by the communication interface 204, as well as a selected zone, and may further have access to a current setting of the first input device 104-1 and hence a current volume of the speaker 108. Indeed, the first processor 201 may receive input from the first input device 104-1 corresponding to a selected volume and control the speaker 108 accordingly. Due to the limited functionality of the first processor 201, as compared to the second processor 202, a power-up time thereof may be shorter than that of the second processor 202. However, the power-up time of the first processor 201 being shorter than the power-up time of the second processor 202 may be due to respective architectures of the processors 201, 202.

In contrast to the first processor 201, the second processor 202 may provide extended functionality of the communication device 100 (e.g. additional functionality of the communication device 100, other than the radio functionality associated with the communication interface 204 provided by the first processor 201), which may include, but is not limited to, operating system functionality of an operating system of the communication device 100, as implemented by the second processor 202; messaging functionality of a messaging application implemented by the second processor 202; functionality of any other applications implemented by the second processor 202; and the like, amongst other possibilities. In more specific examples, the extended functionality provided by the second processor 202 may include, but is not limited to, maintaining and/or providing one or more of a current time, a network signal strength indicator, a battery indicator, functionality of the aforementioned messaging application, functionality of a telephone call application, functionality of a zone editing application, functionality of a contacts application, functionality of higher bandwidth communications and/or functionality (e.g., applications that may relatively use a lot of bandwidth) such as web browsing, database searching, and the like, amongst other possibilities.

It may be critical that communication interface-related information, for example indicating radio functionality associated with the communication interface 204, be provided at the communication device 100 as soon as possible after the communication device 100 is turned on (e.g. and/or under other circumstances as described herein) and over which audio communications and/or limited or lower bandwidth communications and/or functionality, such as location updates, and the like, may be provided. Such communication interface-related information may include, but is not limited to, an indication of one or more of: a channel on which the communication interface 204 is communicating; a zone of the channel; a volume associated with the channel; and the like, amongst other possibilities.

As will be described herein, the first processor 201 is generally configured to after the first power-up time: control the display screen 102 to provide a first graphic user interface programmed to display communication interface-related information and a power-up status of the second processor 202; and after the second power-up time, hand off control of the display screen 102 to the second processor 202.

For example, the processors 201, 202 are both generally configured to communicate via the communication bus 206, and the second processor 202 may provide, to the first processor 201, after the second power-up time (e.g., when the second processor 202 is powered up, and/or ready), a ready indicator to the first processor 201 to indicate to the first processor 201 that the second power-up time has ended and/or that the second processor 202 is ready to control the display screen 102 to control the display screen 102 as described herein. Such a ready indicator is described herein with respect to FIG. 6.

Put another way, a hand off of control of the display screen 102 from the first processor 201 to the second processor 202 may occur when the ready indicator is received at the first processor 201.

The first processor 201 is generally further configured to provide the radio functionality associated with the communication interface 204 after the first power-up time (e.g., and while the device 100 is on).

The second processor 202 is generally configured to, after being provided with control of the display screen 102: control the display screen 102 to provide a second graphic user interface (GUI) programmed to display the communication interface-related information and information associated with the extended functionality.

As the processors 201, 202 may be generally configured to communicate with each other via the communication bus 206, the second processor 202 may be further configured to, during the second power-up time: provide the power-up status of the second processor 202 to the first processor via the communication bus 206, to enable the first processor 201 to incorporate the power-up status of the second processor 202 into the first GUI. Such a power-up status is described herein with respect to FIG. 5.

It is further understood that only one processor 201, 202 at a time provides a GUI to the display screen 102.

In general, while not depicted, the memory 208 may store an indication of the current channel on which the communication interface 204 is communicating and/or a zone of the channel and/or a current volume, and the first processor 201 may retrieve such an indication (or indications) from the memory 208. Alternatively, or in addition, the first processor 201 may communicate with the communication interface 204 to determine the current channel on which the communication interface 204 is communicating, and process zone indications, that store the logical groupings of channels, to determine which zone the current channel is associated with. Alternatively, or in addition, to determine an indication of volume, the first processor 201 may read a current setting of the volume knob, and the like, of the first input device 104-1. However, any suitable communication interface-related information may be determined and/or read and/or retrieved by the first processor 201 in any suitable manner.

Similarly, the first processor 201 may be further configured to, after the second power-up time: provide the communication interface-related information to the second processor 202 via the communication bus 206, to enable the second processor 202 to incorporate the communication interface-related information into the second GUI. Such communication interface-related information is described herein with respect to FIG. 5 and FIG. 7.

Furthermore, the second processor 202 may be further configured to, after the second power-up time: provide a ready indication to the first processor 201 via the communication bus 206, for example to generally indicate to the first processor 201 when to hand off control of the display screen 102 to the second processor 202. In particular, the first processor 201 may be further configured to hand off control of the display screen to the second processor, after the second power-up time, upon receipt of the ready indication. Such a ready indicator is described herein with respect to FIG. 6.

For example, as further depicted in FIG. 2, the communication device 100 further comprises switch circuitry 214 communicatively coupled with the first processor 201, the second processor 202, and the display screen 102. The switch circuitry 214 is generally configured to: in a first state (e.g. as depicted), relay the first graphic interface from the first processor 201 to the display screen 102; and in a second state, relay the second graphic interface from the second processor 202 to the display screen 102.

As depicted, the communication device 100 further comprises switch control circuitry 216 communicatively coupled with the first processor 201, the second processor 202, and the switch circuitry 214. The switch control circuitry 216 may control the switch circuitry 214 between the first state and the second state, for example under control of one of the processors 201, 202. It is understood, however, that only one of the processors 201, 202 at a time controls the switch control circuitry 216 (e.g., and hence only of the processors 201, 202 at a time controls the switch circuitry 214).

For example, the first processor 201 may be generally configured to initially control the switch circuitry 214 to the first state (e.g. so that the first processor 201 may control the display screen 102 to provide the first graphic user interface by communicating with the display screen 102 via the switch circuitry 214) by communicating with the switch control circuitry 216, to instruct the switch control circuitry 216 to instruct the switch circuitry 214 to enter the first state.

Put another way, the first processor 201 may be further configured to control which of the first processor 201 and the second processor 202 controls the switch circuitry 214 to the first state or the second state, for example via the switch control circuitry 216. For example, while only one of the processors 201, 202 may control the circuitry 214, 216, the first processor 201 may control which of the processors 201, 202 has such control.

Furthermore, it is understood that, upon power up of the communication device 100 (e.g. and under other conditions described herein), the first processor 201 may generally have control over the switch control circuitry 216. However, the first processor 201 may hand off control of the display screen 102 to the second processor 202 by handing off control of the switch circuitry 214 to the second processor 202; in particular, the first processor 201 may hand off control of the control of the display screen 102 to the second processor 202 by handing off control of the switch control circuitry 216 to the second processor 202. Such handing off of control may occur when the first processor 201 receives a ready indicator from the second processor 202, after the second power-up time, via the communication bus 206.

Put another way, the first processor 201 may be further configured to: initially control the switch circuitry 214 to the first state; control the display screen 102 to provide the first GUI by communicating with the display screen 102 via the switch circuitry 214; and hand off control of the display screen 102 to the second processor 202 by handing off control of the switch circuitry 214 to the second processor 202 (e.g. via handing off control of the switch control circuitry 216 to the second processor 202).

Similarly, the second processor 202 may be further configured to, after being provided with control of the switch circuitry 214: control the switch circuitry 214 to the second state (e.g. via controlling the switch control circuitry 216); and control the display screen 102 to provide the second graphic user interface by communicating with the display screen 102 via the switch circuitry 214.

Regardless, it is understood that after the first power-up time, the first processor 201 controls the switch circuitry 214, and hence the display screen 102, and after the second power-up time, the first processor 201 may hand off control of the switch circuitry 214 to the second processor 202 by handing off control of the switch control circuitry 216 to the second processor 202.

The switch circuitry 214 may comprise a switch, and the like, which, as depicted, includes a "SELECT" input communicatively coupled with the switch control circuitry 216. The switch control circuitry 216 may include, but is not limited to, any suitable combination of one or more of at least one AND gate, at least one NAND gate, at least one OR gate, at least one NOR gate, at least one logical inverter, and the like for providing the aforementioned control of the switch circuitry 214. An example of the switch control circuitry 216 is described with reference to FIG. 8.

As depicted, the communication device 100 further comprises display-reset control circuitry 218 communication with the first processor 201, the second processor 202, and a "RESET" input of the display screen 102. An example of the display-reset control circuitry 218 is also described with reference to FIG. 8.

As depicted, the first processor 201 comprises respective pins 801, 802, 805, 807, and the second processor 202 comprises respective pins 811, 815, 817. Operation of the device 100 will be described hereafter with reference to such pins, though any suitable manner of operating the device 100 as described herein is within the scope of the present specification.

It is furthermore understood that the processors 201, 202 may be communicatively coupled with the switch control circuitry 216 via one or more suitable pins (e.g. as depicted, one pin 801 of the first processor 201 and one pin 811 of the second processor 202), that output respective binary signals (e.g. high or low signals) for controlling the gates, etc., of the switch control circuitry 216. In a particular example, one pin 801, 811 from each of the processors 201, 202 may be connected to an input of an AND gate of the switch control circuitry 216.

In addition, one pin 802 of the first processor 201 may be connected to between the AND gate output and a SELECT input of the switch circuitry 214 to receive feedback from the AND gate output.

Figure 8:
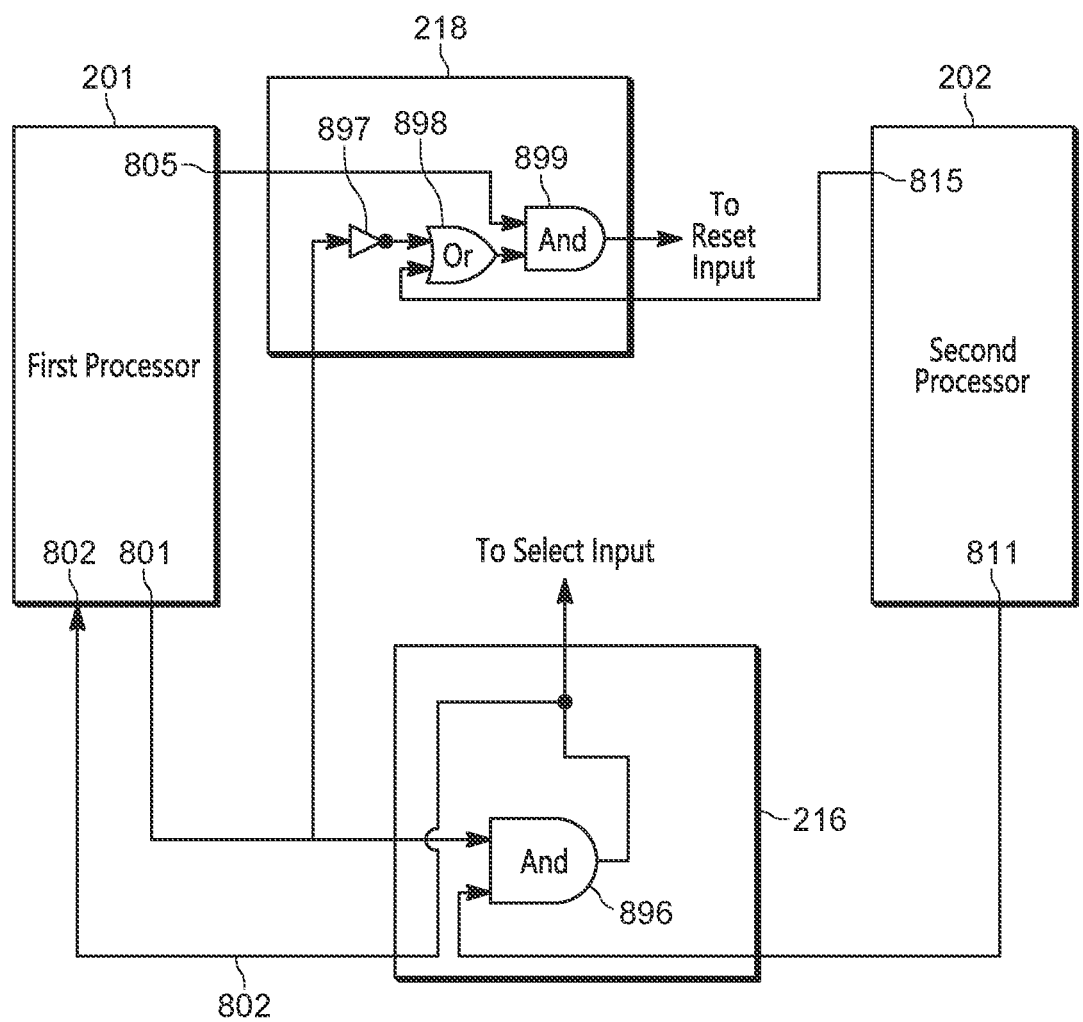
FIG. 8 depicts an example of switch control circuitry and display-reset circuitry of the device structure of FIG. 2, in accordance with some examples.

For example attention is directed to FIG. 8 which depicts one example of the switch control circuitry 216 and the display-reset control circuitry 218. While FIG. 8 depicts only the processor 201, 202 and switch control circuitry 216, the display-reset control circuitry 218), and connections therebetween, the remainder of the device 100 is understood to be present.

In particular, one pin 801, 811 from each of the processors 201, 202 is connected to inputs of an AND gate 896 of the switch control circuitry 216, and an output of the AND gate 896 is to the SELECT input of the switch circuitry 214. Hence, depending on whether binary outputs from each of the of pins 801, 811 are both high or not, the AND gate 896 outputs a corresponding binary output to the SELECT input of the switch circuitry 214. For example, when both binary outputs from each of the of pins 801, 811 from the processors 201, 202 are high (e.g., 1), then the output of the AND gate 896 is high (e.g. 1). However, when the binary outputs from each of the of pins 801, 811 from the processors 201, 202 are different (e.g. one is high and/or 1, and one is low and/or 0) or both are low (e.g. both are 0), the output of the AND gate 896 is low (e.g. 0).

In a particular scheme, when the output of the AND gate 896 is low, then the switch circuitry 214 may be controlled to the first state in which the switch circuitry 214 is connected to the first processor 201, and the first processor 201 may output a first GUI to the display screen 102. Conversely, in this scheme, when the output of the AND gate 896 is high, then the switch circuitry 214 may be controlled to the second state in which the switch circuitry 214 is connected to the second processor 202, and the second processor 202 may output a second GUI to the display screen 102.

Hereafter the terms low, low output, and low signal will be used interchangeably (e.g., which may be "0") and, similarly, the terms high, high output and high signal (e.g., which may be "1") will be used interchangeably.

Furthermore, the first processor 201, by outputting a low output to the AND gate 896 via the pin 801 may force the AND gate 896 to output a low output to the SELECT input of the switch circuitry 214 regardless of the output of the second processor 202, thereby controlling the switch circuitry 214 into the first state.

However, the first processor 201, by outputting a high output to the AND gate 896 via the pin 801 may enable the second processor 202 to control the switch circuitry 214, for example by way of the second processor 202 outputting a low or high output via the pin 802 to the AND gate 896. For example, when the first processor 201 outputs a high output via the pin 801 to the AND gate 896, and the second processor 202 outputs a low output via the pin 811 to the AND gate 896, the AND gate 896 continues to output a low output to the SELECT input of the switch circuitry 214 such that the switch circuitry 214 remains in the first state. However, when the first processor 201 outputs a high output via the pin 801 to the AND gate 896, and the second processor 202 outputs a high output via the pin 811 to the AND gate 896, the AND gate 896 outputs a high output to the SELECT input of the switch circuitry 214, such that the switch circuitry 214 switches to the second state.

Hence, the first processor 201 may control which of the processors 201, 202 control the AND gate 896, and hence the switch circuitry 214, by outputting a high or low output to the AND gate 896.

As depicted, the pin 802 is connected to the output of the AND gate 896 so that the first processor 201 may receive the output of the AND gate 896 as feedback to determine whether the output of the AND gate 896 is high or low, and hence further determine whether the switch circuitry 214 is in the first state or the second state.

Hence, different combinations of binary signals received at the switch control circuitry 216 from the processors 201, 202 is understood to indicate, to the switch control circuitry 216: which processor 201, 202 has control of the switch control circuitry 216; and into which state the switch circuitry 214 is to be controlled.

The different combinations of binary signals are understood to depend on the architecture of the switch control circuitry 216. For example, rather than the AND gate architecture of the switch control circuitry 216 depicted in FIG. 8, the switch control circuitry 216 may have a NAND gate architecture of the switch control circuitry 216, with the binary signals from the processors 201, 202 adapted accordingly.

Hence, the switch control circuitry 216 may hence instruct the switch circuitry 214 into the first state by outputting a high or low signal to the SELECT input (e.g. a low signal for the first state and a high signal for the second state using the AND gate architecture of FIG. 8), and the switch control circuitry 216 may instruct the switch circuitry 214 into the second state by outputting the other of a high or low signal to the SELECT input.

While the present specification is described with respect to the first processor 201 controlling which of the processors 201, 202 controls the switch control circuitry 216, in other examples, the second processor 202 may control which of the processor 201, 202 controls the switch control circuitry 216, depending on the architecture of the switch control circuitry 216, and with the combinations of binary signals output by the processors 201, 202 adapted accordingly.

Returning to FIG. 2, the communication device 100 further comprises the display-reset control circuitry 218 in communication with the first processor 201, the second processor 202, and a "RESET" input of the displays screen 102. The display-reset control circuitry 218 is configured to: reset the display screen 102 prior to the first processor 201 controlling the display screen 102 to provide the first graphic user interface; and reset the display screen 102 prior to the second processor 202 controlling the display screen 102 to provide the second graphic user interface.

For example, the first processor 201 may be further configured to control the display-reset control circuitry 218 to reset the display screen 102 prior to controlling the display screen to provide the first graphic user interface, for example by controlling the display-reset control circuitry 218 to at least temporarily output a reset (e.g. high) signal to the RESET input of the display screen 102 (e.g. a high signal may be output to the RESET input of the display screen 102 for a given time period, such as 100 ms, 150 ms, 200 ms, and the like, amongst other possibilities). Indeed, the display-reset control circuitry 218 may otherwise be outputting a low signal to the RESET input of the display screen 102.

Similarly, the second processor 202 may be further configured to control the display-reset control circuitry 218 to reset the display screen 102 prior to controlling the display screen 102 to provide the second graphic user interface.

Control of which of the processors 201, 202 is controlling the display-reset control circuitry 218 may be also be via pins of the processors 201, 202.

For example, similar to the switch control circuitry 216, the display-reset control circuitry 218 may include, but is not limited to, any suitable combination of one or more of at least one AND gate, at least one NAND gate, at least one OR gate, at least one NOR gate, at least one logical inverter, and the like for providing the aforementioned reset signal to the display screen 102.

Attention is again directed to FIG. 8 which depicts a specific example of the display-reset control circuitry 218.

As depicted, the first processor 201 may be communicatively coupled with the display-reset control circuitry 218 via the pins 801, 805, and the second processor 202 may be communicatively coupled with the display-reset control circuitry 218 via the pin 815. The pins 801, 805, 807 output binary signals (e.g. high or low signals) for controlling the gates, etc., of the display-reset control circuitry 218. Indeed, different combinations of binary signals received at the display-reset control circuitry 218 from the processors 201, 202 via the pins 801, 805, 815 is understood to indicate, to the display-reset control circuitry 218: which processors 201, 202 has control of the display-reset control circuitry 218; and when to output a reset signal to the display screen 102. Similar to the switch control circuitry 216, whether high or low signals are output to the display-reset control circuitry 218 by the processors 201, 202 may depend on the architecture of the display-reset control circuitry 218.

For example, as depicted in FIG. 8, the same pin 801 from the first processor 201 that outputs a binary signal to the switch control circuitry 216 may output the same signal to an input of an inverter 897 of the display-reset control circuitry 218, and the inverter 897 outputs an inverted binary signal to an input of an OR gate 898 of the display-reset control circuitry 218. The pin 815 of the second processor 202 is also connected to an input of the OR gate 898. The output of the OR gate 898 is output to an input of an AND gate 899 of the display-reset control circuitry 218, and another pin 805 of the first processor 201 is also connected to an input of the AND gate 899. The output of the AND gate 899 is connected to the RESET input of the display screen 102. In a particular scheme, when the output of the AND gate 899 is low, the display screen 102 is controlled to reset, and when the output of the AND gate 899 is high, the display screen 102 stops resetting and/or renders (or continues to render) any suitable GUI (e.g. as received from one of the processor 201, 202).

Furthermore, output of the OR gate 898 is understood to be high when one or more inputs to the OR gate 898 are high, and output of the OR gate 898 is understood to be low when both inputs to the OR gate 898 are low.

Hence, when the output of the first processor 201 from the pin 801 to the AND gate 896 and the inverter 897 is low, the output of inverter 897 to the OR gate 898 may be high as the inverter 897 inverts the low output to high output that is input to the OR gate 898. As such, under these conditions, the output of the OR gate 898 to the AND gate 899 is high regardless of the output of the pin 815 of the second processor 202 to the OR gate 898. Under these conditions, the first processor 201 may control the display screen 102 into and out of the reset state by outputting a low or high signal to the AND gate 899 via the pin 805 (e.g. a low signal from the pin 805 controls the display screen 102 to reset, and a high signal from the pin 805 controls the display screen 102 to stop resetting and/or to render any suitable GUI), regardless of the output of the second processor 202 on the pin 815.

However, when the output of the first processor 201 from the pin 801 to the AND gate 896 (such that the second processor 202 controls the switch circuitry 214) and the inverter 897 is high, the output of inverter 897 to the OR gate 898 may be low as the inverter 897 inverts the high output to low output that is input to the OR gate 898. As such, under these conditions, the output of the OR gate 898 to the AND gate 899 may be controlled by the second processor 202. For example, a low output on the pin 815 to the OR gate 898 by the second processor 202 causes the OR gate 898 to output a low signal to the AND gate 899, and a high output on the pin 815 to the OR gate 898 by the second processor 202 causes the OR gate 898 to output a high signal to the AND gate 899. Under these conditions, the first processor 201 may output a high signal to the AND gate 899 via the pin 805 so that the second processor 202 may control the output of the AND gate 899 to the RESET input of the display screen 102 by controlling the output of the pin 815 to low or high.

Hence, the pin 801 of the first processor 201 that is communicatively coupled to the switch control circuitry 216 and the display-reset control circuitry 218 may indicate to both the switch circuitry 214 and the display-reset control circuitry 218 which of the processors 201, 202 has control over the switch circuitry 214 and the display-reset control circuitry 218, presuming that output of the pin 805 is controlled accordingly.

Returning to FIG. 2, It is further understood that the pins 807, 817 are communicatively coupled to the switch circuitry 214 and are used by the respective processors 201, 202 to provide respective GUIs to the switch circuitry 214.

It is furthermore understood that while a second display screen may be incorporated into the communication device 100, for example a first display screen dedicated to providing the aforementioned communication interface-related information and the power-up status of the second processor 202, and second display screen dedicated to providing the aforementioned information associated with the extended functionality of the second processor 202, incorporation of two display screens present further technical challenges. For example, incorporation of two display screens into the communication device 100 would require (e.g. inconveniently) dedicating an external portion of the communication device 100 to the two display screens, and may require that a primary display screen (e.g. such as screen dedicated to providing the aforementioned information associated with the extended functionality of the second processor 202) would have to be made smaller to accommodate the other display screen. Indeed, use of the one display screen 102 generally enables maximizing a size of the display screen 102. Furthermore, two display screens would also generally increase cost of the communication device 100, as the various circuitry 214, 216, 218 may generally cost less than a second display screen.

The processors 201, 202 may implement any other suitable functionality consistent with the remainder of the present specification.

For example, the display screen 102 may comprise a touch screen that may be disabled during the first power-up time of the first processor 201 and/or that may be disabled while the second processor 202 is powering up. Put another way, the touch screen may be disabled during the second power-up time of the second processor 202, and/or the touch screen may be disabled during both the first power-up time of the first processor 201 and the second power-up time of the second processor 202. However, the second processor 202 may be further configured to, after being provided with control of the display screen 102: enable the touch screen.

For example, while not depicted, the second processor 202 may be connected (e.g. via another pin, not depicted) to a touch screen enable INPUT (also not depicted) of the display screen 102, and, the second processor 202 may, after being provided with control of the display screen 102 enable the touch screen by providing a high output to the touch screen enable INPUT; in some examples, the pin 811 may be connected to such a touch screen enable INPUT of the display screen 102 such that, when a high output on the pin 811 causes the switch circuitry 214 to switch to the second state, the touch screen may be enabled. Such an example assumes that the touch screen is enabled with a high output is received at a touch screen enable INPUT of the display screen 102, and that the touch screen is disabled with a low output is received at a touch screen enable INPUT of the display screen 102. However, any suitable scheme for enabling or disabling the touch screen of the display screen 102 is within the scope of the present specification.

To save power and processing resources at the communication device 100, the touch screen may be disabled until the second processor 202 is ready and/or enabled to control the display screen 102 (e.g., as operation of the touch screen may consume power and processing resources).

In other examples, the second processor 202 may be further configured to, when the second processor 202 crashes and needs to again power up: hand off control of the display screen 102 to the first processor 201, such that the first processor 201 again controls the display screen 102 to provide the first GUI, while the second processor 202 again powers up according to the second power-up time. In these examples, the first processor 201 may be further configured to again hand off control of the display screen 102 to the second processor 202 after the second processor 202 again powers up according to the second power-up time.

Put another way, when the second processor 202 crashes, the second processor 202 may indicate to the switch control circuitry 216, via outputs on the aforementioned pins, that control of the switch circuitry 214 (e.g. and the display-reset control circuitry 218) is to be handed back to the first processor 201, for example while the second processor 202 reboots (e.g. and such a reboot may be automatic while the second processor 202 has power). The first processor 201 controls the switch circuitry 214 to the first setting so that the first GUI is again provided to the display screen 102 until after the second power-up time, and/or when a ready indication is received from the second processor 202. Hence, the processes described herein with respect to the first processor 201 and the second processor 202 repeat when the second processor 202 crashes and reboots.

In yet further examples, the second processor 202 may be further configured to: enter a sleep state when sleep conditions are met at the second processor 202, the second processor 202 powering down for the sleep state; hand off control of the display screen 102 to the first processor 201 prior to entering the sleep state, such that the first processor 201 again controls the display screen 102 to provide the first GUI during the sleep state; and power up according to the second power-up time when a wake condition is detected via the one or more input devices 104 (e.g. and/or the PTT button 106, and/or any other suitable input device). In these examples, the first processor 201 may be further configured to again hand off control of the display screen 102 to the second processor 202 after the second processor 202 again powers up according to the second power-up time.

Put another way, when input devices of the communication device 100 (e.g. the input devices 104, the PTT button 106, the touch screen of the display screen 102, etc.) are not operated for a given period of time (e.g. such as 15 minutes, 20 minutes, 30 minutes, amongst other possibilities) a sleep condition (e.g. as stored at the second application 212) may be met, and the second processor 202 may enter a sleep state.

In the sleep state, the second processor 202 at least partially powers down (e.g. which may include powering down the touch screen of the display screen 102), and/or entering a low power mode.

In these examples, before powering down, during powering down, and the like, the second processor 202 may indicate to the switching control circuitry 216, via outputs on the aforementioned pins, that control of the switching circuitry 214 (e.g. and the display-reset control circuitry 218) is to be handed back to the first processor 201. The first processor 201 controls the switch circuitry 214 to the first setting so that the first GUI is again provided to the display screen 102. However, at least one of the processors 201, 202 may monitor the input devices 104, the PTT button 106, etc., to determine when they are again operated.

Later, one or more of the processors 201, 202 may detect when input is received at an input device, which may comprise a wake condition (e.g. as stored at the first application 211 and/or the second application 212). For example, the first processor 201 may receive input from an input device via the communication bus 206. Alternatively, or in addition, the second processor 202 in the sleep state may monitor input from the input devices via the communication bus 206 (e.g. but otherwise provides limited functionality).

The second processor 202 again begins to power up according to the second power-up time, and the first processor 201 again hands off control of the display screen 102 to the second processor 202 after the second power-up time, and/or when a ready indication is received from the second processor 202 via the communication bus 206. Hence, the processes described herein with respect to the first processor 201 and the second processor 202 may repeat when the second processor 202 wakes up after previously entering a sleep state.

While the communication device 100 has been described with respect to a particular combination of circuitry 214, 216, 218, it is understood that such circuitry 214, 216, 218 may be provided and/or combined in any suitable manner. Furthermore, one or more of the circuitry 214, 216, 218 may be combined with the display screen 102.

Attention is now directed to FIG. 3, which depicts a flowchart representative of a method 300 for display screen control using two processors. The operations of the method 300 of FIG. 3 correspond to machine readable instructions that are executed by the processors 201, 202. In the illustrated example, the instructions represented by the blocks of FIG. 3 are stored at the memory 208 for example, as the applications 211, 212. The method 300 of FIG. 3 is one way in which the processors 201, 202 and/or the communication device 100 may be configured. Furthermore, the following discussion of the method 300 of FIG. 3 will lead to a further understanding of the communication device 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the communication device 100 of FIG. 1, as well.

It is further understood that blocks 302, 304 of the method 300 are performed by the first processor 201 (e.g. implementing the first application 211), and the block 306 of the method 300 is performed by the second processor 202 (e.g. implementing the second application 212). To indicate such, a broken line divides the blocks 302, 304 from the block 306.

At a block 302, the first processor 201, controls the display screen 102 to provide a first graphic user interface programmed to display communication interface-related information and a power-up status of the second processor 202.

At a block 304, the first processor 201, after the second power-up time, hands off control of the display screen 102 to the second processor 202.

At a block 306, the second processor 202, after being provided with control of the display screen: controls the display screen 102 to provide a second graphic user interface programmed to display the communication interface-related information and information associated with extended functionality of the second processor 202.

Figure 4:
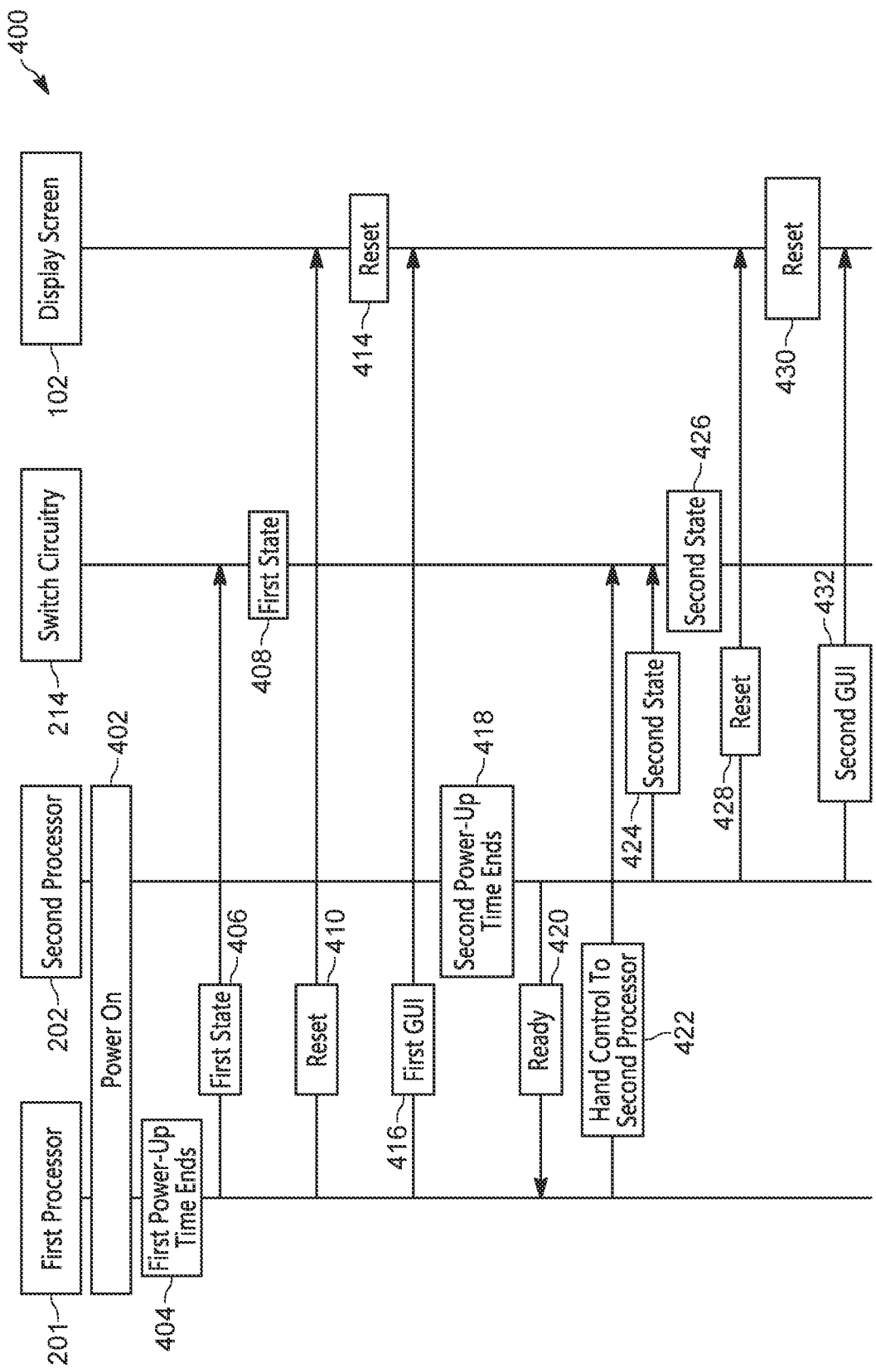
FIG. 4 depicts a signal diagram showing components of the system of FIG. 1 implementing a method for display screen control using two processors, in accordance with some examples.

Attention is next directed to FIG. 4, which depicts a signal diagram 400 showing components of the system of FIG. 1 implementing the method 300 for display screen control using the two processors 201, 202. While the signal diagram 400 is described without reference to the circuitry 216, 218, such circuitry 216, 218 may be present and/or at least partially combined with other components of the communication device 100, such as the switch circuitry 214 and/or the display screen 102.

It is furthermore understood in the signal diagram 400 that the circuitry 214, 216, 218, and the like, are initially under control of the first processor 201. Indeed, the circuitry 214, 216, 218, and the like, being under control of the first processor 201 may be a default state of the communication device 100.

As depicted, it is understood that the communication device 100 is powered on 402, such that power is provided to the processors 201, 202 and the first and second power-up times begin. As the first power-up time is shorter than the second power-up time, the first power-up time ends 404 before the second power-up time. After the first power-up time ends 404, the first processor 201 controls the switch circuitry 214 via a signal 406 (e.g. to the switch control circuitry 216, such as a low output on the pin 801) indicating that the switch circuitry 214 is to be controlled to the first state. The signal 406 may also indicate that the switch circuitry 214 is under control of the first processor 201.

In response to the signal 406, the switch circuitry 214 switches 408 to the first state, if not already in the first state; or, if the switch circuitry 214 is already in the first state, the switch circuitry 214 remains in the first state. Indeed, the first state may be a default state of the switch circuitry 214.

The first processor 201 resets the display screen 102 via a signal 410 (e.g. to the display-reset control circuitry 218, such as a low signal on the pin 805 for a given period of time, such as 100 ms, 150 ms, 200 ms, presuming a low signal on the pin 801) indicating that the display screen 102 is to be reset and, in response, the display screen 102 resets 414.

The first processor 201 then controls the display screen 102 to provide a first GUI 416, by providing the first GUI 416 to the display screen 102 via the switch circuitry 214, for example using the pin 807.

Sometime later, the second power-up time ends 418, and the second processor 202 provides a ready indication 420 to the first processor 201 (e.g. via the communication bus 206), and the first processor 201 responsively hands control of the display screen 102 to the second processor 202 via a signal 422 that places the switch circuitry 214 under control of the second processor 202 (e.g., a high signal on the pin 801; under these conditions, an output of the pin 805 may be changed from low to high, for example after the pin 801 outputs a high signal so as to not erroneously put the display screen 102 into the reset state, though such a reset may only thereafter occur when output from the pin 815 is low).

While for simplicity the signal 422 is depicted as being provided to the switch circuitry 214, indicating that the switch circuitry 214 is placed under control of the second processor 202, the signal 422 may be provided to the switch control circuitry 216. It is understood that the signal 422 does not control the state of the switch circuitry 214, but rather enables the second processor 202 to control the state of the switch circuitry 214.

The second processor 202 controls the switch circuitry 214 via a signal 424 (e.g., via a high output to the switch control circuitry 216 on the pin 811) indicating that the switch circuitry 214 is to be controlled to the second state. In response to the signal 424, the switch circuitry 214 switches 426 to the second state.

The second processor 202 resets the display screen 102 via a signal 428 (e.g. such as a low signal on the pin 815 for a given period of time, such as 100 ms, 150 ms, 200 ms, presuming a high signal on the pin 805) to the display-reset control circuitry 218, indicating that the display screen 102 is to be reset and, in response, the display screen 102 resets 430.

The second processor 202 then controls the display screen 102 to provide the second GUI 432, by providing the second GUI 432 to the display screen 102 via the switch circuitry 214.

It is further understood that the both of the processors 201, 202 may output respective GUIs 416, 432 to the switch circuitry 214 concurrently, but the switch circuitry 214 only provides one GUI 416, 432 to the display screen 102 at a time, depending on a state of the switch circuitry 214.

Figure 5:
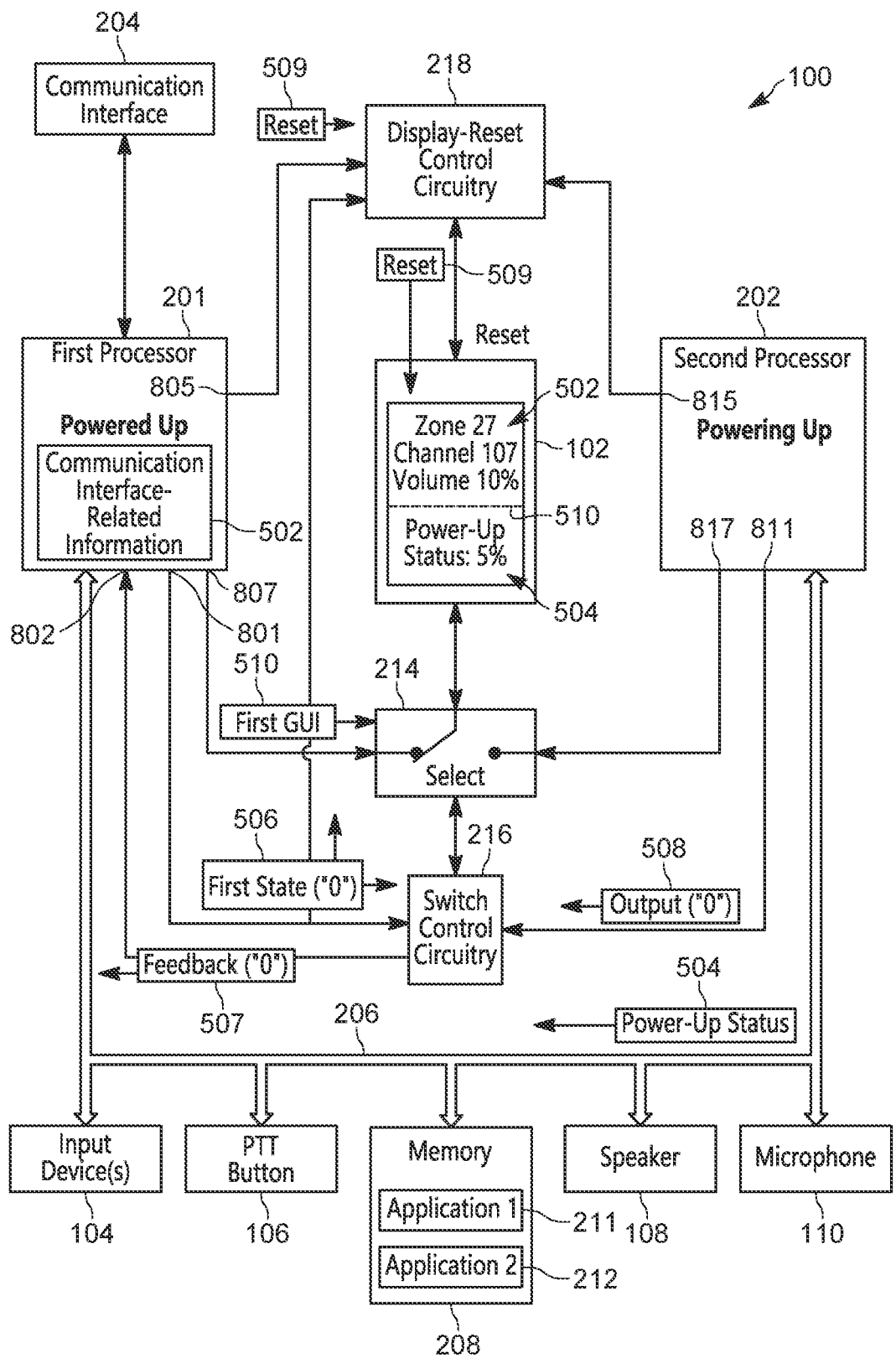
FIG. 5 depicts the device structure of FIG. 2 implementing a method for display screen control using two processors, in accordance with some examples.
Figure 6:
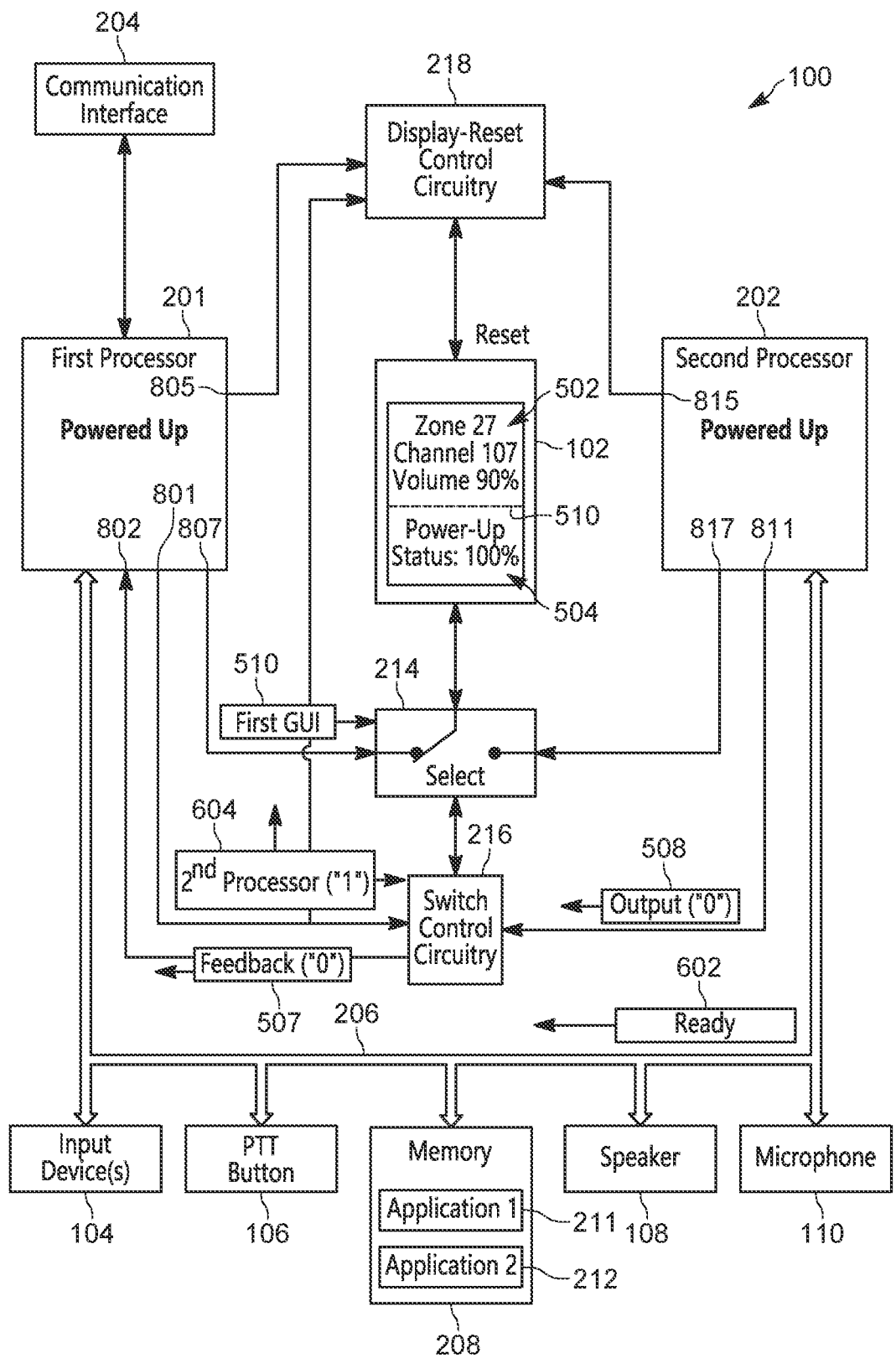
FIG. 6 depicts the device structure of FIG. 2 continuing to implement a method for display screen control using two processors, in accordance with some examples.
Figure 7:
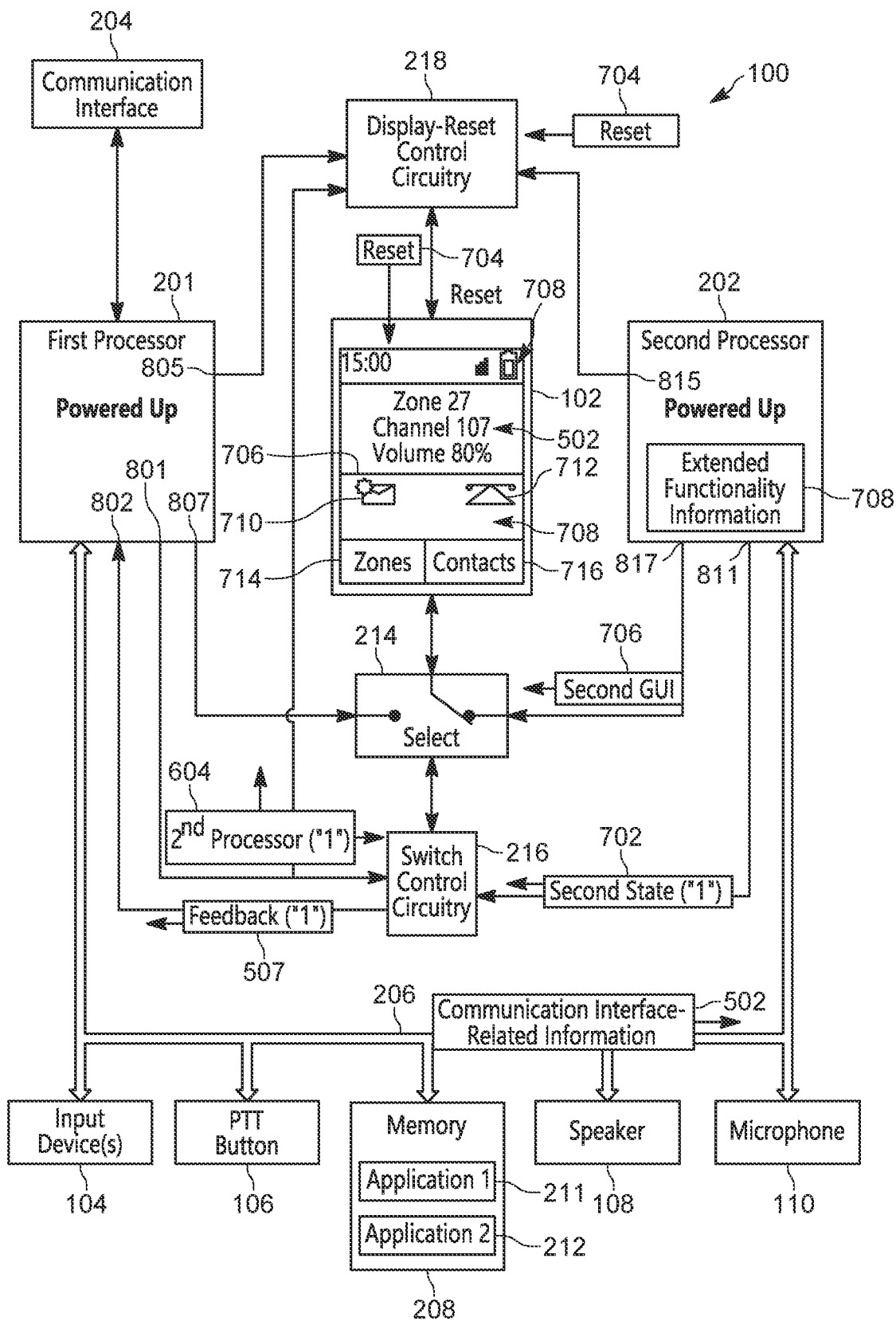
FIG. 7 depicts the device structure of FIG. 2 implementing a method for display screen control using two processors, in accordance with some examples.

Aspects of the method 300 are next described with respect to FIG. 5, FIG. 6, and FIG. 7, which are substantially similar to FIG. 2, with like components having like numbers. Furthermore, FIG. 5, FIG. 6, and FIG. 7 will be described independently from the signal diagram 400, though signals of the signal diagram 400 and signals and GUIs of FIG. 5, FIG. 6, and FIG. 7 may be the same and/or similar. The examples of FIG. 5, FIG. 6, and FIG. 7 will be further described with respect to the architecture of FIG. 8.

With attention first directed to FIG. 5, it is understood that power to the processors 201, 202 has been turned on, and/or that the second processor 202 has previously crashed and/or entered a sleep state, and is booting back up and/or turning back on. It is further understood in FIG. 5, that the first power-up time of the first processor 201 has ended, but the second power-up time of the second processor 202 is still on-going. Hence, the first processor 201 is labelled as "Powered Up", and the second processor 202 is labelled as "Powering Up". A touch screen of the display screen 102 may be disabled in this configuration.

As depicted, the first processor 201 has determined and/or received and/or retrieved communication interface-related information 502, and is receiving, from the second processor 202, the power-up status 504 of the second processor 202 via the communication bus 206. The power-up status 504 may indicate what fraction and/or percentage of a power-up and/or boot-up process has been implemented at the second processor 202.

The first processor 201 provides a signal 506 to the switch control circuitry 216 and the display-reset control circuitry 218, on the pin 801, to place the switch circuitry 214, the switch control circuitry 216 and the display-reset control circuitry 218 under control of the first processor 201. For example, the signal 506 may be a low signal and/or "0". The signal 506 furthermore causes the first processor 201 to maintain control of the switch circuitry 214, the switch control circuitry 216 and the display-reset control circuitry 218, such that, the output of the pins 811, 815 of the second processor 202 does not cause the circuitry 214, 216, 218 to change state.

The signal 506 is further understood to control the switch circuitry 214 to the first state (e.g. if the switch circuitry 214 is not already in the first state, the signal 506 controls the switch circuitry 214 into the first state, or, if the switch circuitry 214 is already in the first state, the signal 506 controls the switch circuitry 214 to remain in the first state). Indeed, as depicted, the switch circuitry 214 is in the first state, connecting the first processor 201 to the display screen 102 via the pin 807.

For completeness, an output 508 of a low signal and/or "0" of the second processor 202 on the pin 811 to the switch control circuitry 216 is also depicted. Put another way, while the second processor 202 is powering up, the second processor 202 outputs a low signal on the pin 811 (e.g., as well as on the pin 815).

Also depicted in FIG. 5 is feedback 507 of "0" from the switch control circuitry 216 to the pin 802 indicating that the switch circuitry 214 is being controlled to the first state. For example, the feedback 507 may be from the output of the AND gate 896 indicating that an output of "0" from the switch control circuitry 216 to the SELECT input of the switch circuitry 214 that controls the switch circuitry 214 into the first state in which the pin 807 of the first processor 201 is connected to the display screen 102 via the switch circuitry 214 (as depicted in FIG. 5).

The first processor 201 further provides a reset signal 509 to the display-reset control circuitry 218 (e.g. on the pin 805, which may change for a reset time period from a high output to a low output), to cause the display screen 102 to reset; for example, the reset signal 509 is provided to the display screen 102 via the display-reset control circuitry 218. While the resetting of the display screen 102 is not depicted, it is understood that such resetting may comprise drawing a blank and/or black and/or white image at the display screen 102, and/or clearing registers of the display screen 102, and the like. In general, the resetting of the display screen 102 prepares the display screen 102 to receive and render a GUI, and the like.

While output of the pin 815 is not depicted, it is understood to be low and/or "0".

As depicted, after providing the reset signal 509, the first processor 201 may pause for a reset time period, such as 100 ms, 150 ms, 200 ms, amongst other possibilities, the reset time period comprising a predetermined time period for the display screen 102 to reset. Indeed, the reset signal 509 may be provided for the reset time period. After the reset time period, the first processor 201 generates and provides a first GUI 510 to the display screen 102 via the switch circuitry 214 in the first state, for example using the pin 807. As depicted, at the display screen 102, the first GUI 510 is programmed to control the display screen 102 to render the communication interface-related information 502 and the power-up status 504 of the second processor 202.

For example, as depicted, the communication interface-related information 502 of the first GUI 510 comprises "Zone 27, Channel 107, and Volume 10%", indicating that the communication interface 204 is presently communicating via a channel "106", which may be a channel of a zone "27", and the speaker 108 is at 10% volume. Furthermore, the power-up status 504 of the second processor 202 of the first GUI 510 indicates that the second processor 202 is "5%" powered up. In some examples, the power-up status 504 rendered by the first GUI 510 may be in the form of graphics showing the power-up status.

Attention is next directed to FIG. 6, which is understood to follow from FIG. 5. At FIG. 6, it is understood that the second power-up time of the second processor 202 has ended and the second processor 202 is powered up, as indicated by a label "Powered Up" at the second processor 202. As such, the second processor 202 provides a ready indicator 602 to the first processor 201 via the communication bus 206.

In response to receiving the ready indication 602, the first processor 201 provides a signal 604 (or combination of signals) on the pin 801 to the switch control circuitry 216 and the display-reset control circuitry 218, to place the switch circuitry 214, the switch control circuitry 216 and the display-reset control circuitry 218 under control of the second processor 202. For example, again presuming the architecture of FIG. 8, the signal 604 may be high and/or "1". However, the output 508 of the pin 811 to the switch control circuitry 216 may initially remain at low and/or "0", and the switch circuitry 214 hence remains in the first state, as also indicated by the feedback 507.

As such, the first GUI 510 continues to be provided to the display screen 102 by the first processor 201, and rendered at the display screen 102. However, as depicted, it is understood that the volume has been increased to "90%", and the power-up status 504 has increased to "100%". Indeed, such an example indicates that the second processor 202 continues to provide an updated power-up status 504 to the first processor 201, which updates the first GUI 510 accordingly, and furthermore the first processor 201 may update the first GUI 510 as the first input device 104-1 is operated to change the volume of the speaker 108.

While not depicted, the first processor 201 may further provide to the second processor 202, via the communication bus 206, an indication that the second processor 202 has control of the switch circuitry 214, the switch control circuitry 216 and the display-reset control circuitry 218.

Attention is next directed to FIG. 7, which is understood to follow from FIG. 6. It is understood in FIG. 7, that the second processor 202 has control of the switch circuitry 214, the switch control circuitry 216 and the display-reset control circuitry 218, for example by way of the signal 604 remaining at a high output (e.g. "1").

At FIG. 7, the second processor 202 provides a signal 702 to the switch control circuitry 216 to control the switch circuitry 214 to the second state (e.g. as depicted a high signal and/or "1", again presuming the architecture of FIG. 8). Indeed, as depicted, the switch circuitry 214 is in the second state, connecting the second processor 202 to the display screen 102 via the pin 817. The signal 604 from the first processor 201 remains at a high output and/or "1". A touch screen of the display screen 102 may be enabled in this configuration.

The second processor 202 further provides a reset signal 704 (e.g. "1") via the pin 815 to the display-reset control circuitry 218, to cause the display screen 102 to reset; for example, the reset signal 704 is provided to the display screen 102 via the display-reset control circuitry 218, and the display screen 102 resets as has been previously described. It is understood that output of the pin 805 of the first processor 201 may be set to a high signal to enable the second processor 202 to control the resetting of the display screen 102 (e.g. presuming the architecture of FIG. 8).

As depicted, after providing the reset signal 704, the second processor 202 may pause for the aforementioned reset time period. After the reset time period, the second processor 202 generates and provides, via the pin 817, a second GUI 706 to the display screen 102 via the switch circuitry 214 in the second state. As depicted, at the display screen 102, the second GUI 706 is programmed to control the display screen 102 to render the communication interface-related information 502 and extended functionality information 708 associated with the extended functionality of the second processor 202.

For example, as depicted, extended functionality information 708 is determined by the second processor 202 and incorporated into the second GUI 706, and may include, but is not limited to the current time, a network signal strength indicator, a battery indicator, an actuatable icon 710 for launching a messaging application, an actuatable icon 712 for launching a telephone call application. an actuatable icon 714 for launching a zone editing application, and an actuatable icon 716 for launching a contacts application (e.g. for finding phone numbers, and the like). However, such information 708 is understood to be examples only and such a list is not meant to be unduly limiting and/or exhaustive.

Furthermore, while the extended functionality information 708 includes certain components that are generally related to the radio functionality of the communication device 100, such as the actuatable icon 714 for launching a zone editing application, such information does not generally affect the operation of the radio functionality of the communication device 100.

As used herein, the term render is understood to include generating a visual component by means of a computer program, and displaying such a visual component at a display screen, such as the display screen 102. In particular, the first GUI 510 is programmed to display and/or render the communication interface-related information 502 and the power-up status 504, and the second GUI 706 is programmed to display and/or render the communication interface-related information 502 and the extended functionality information 708.

Furthermore, the second GUI 706 may include, and/or be programmed to display, and/or render, interactive visual components, as described herein, including, but not limited to, the actuatable icons 710, 712, 714, 716. Hence, the communication device 100 may be configured to render the GUIs 510, 706, and detect when interactive visual components thereof are actuated, and/or the GUIs 510, 706 may comprise programming instructions that, when the GUIs 510, 706 are processed by the communication device 100, cause the GUIs 510, 706 and/or the communication device 100 to render the various visual components of the GUIs 510, 706 at the display screen 102 and detect when interactive visual components thereof are actuated.

Hence, herein, when the GUIs 510, 706 are described as providing certain visual components, it is understood that that the communication device 100 and/or the GUIs 510, 706 are programmed to display and/or render such visual components at the display screen 102, and when such visual components are interactive and/or actuatable, it is further understood that the communication device 100 and/or the GUIs 510, 706 are programmed to receive input via such interactive and/or actuatable visual components, and perform an associated action in response.

As also depicted in FIG. 7, as the feedback 507 has changed from a low signal (and/or "0") to a high signal (and/or "1"), the first processor 201 may stop generating the first GUI 510, as the feedback 507 is indicating that the switch circuitry 214 is in the second state and hence the first processor 201 is no longer connected to the switch circuitry 214.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot reset a display screen, cannot handover control of a display screen from one processor to another processor, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device comprising:
   a communication interface;
   a display screen;
   a communication bus;
   a first processor configured to power up according to a first power-up time, the first processor for implementing radio functionality associated with the communication interface; and
   a second processor configured to power up according to a second power-up time longer than the first power-up time, the second processor for implementing extended functionality as compared to the first processor,
   the first processor further configured to, after the first power-up time:
      control the display screen to provide a first graphic user interface programmed to display communication interface-related information and a power-up status of the second processor; and
      after the second power-up time, hand off control of the display screen to the second processor; and
   the second processor further configured to, after being provided with control of the display screen:
      control the display screen to provide a second graphic user interface programmed to display the communication interface-related information and information associated with the extended functionality,
   wherein the first processor and the second processor are further configured to communicate with each other via the communication bus, and
   wherein the second processor is further configured to, during the second power-up time: provide the power-up status of the second processor to the first processor via the communication bus.

2. The communication device of claim 1, wherein the display screen comprises a touch screen, the touch screen being disabled during the first power-up time, and
   wherein the second processor is further configured to, after being provided with control of the display screen: enable the touch screen.

3. The communication device of claim 1, wherein the first processor is further configured to, after the second power-up time: provide the communication interface-related information to the second processor via the communication bus.

4. The communication device of claim 1, wherein the second processor is further configured to, after the second power-up time: provide a ready indication to the first processor via the communication bus, and
   wherein the first processor is further configured to hand off control of the display screen to the second processor, after the second power-up time, upon receipt of the ready indication.

5. The communication device of claim 1, further comprising switch circuitry configured to:
   in a first state, relay the first graphic interface from the first processor to the display screen; and
   in a second state, relay the second graphic interface from the second processor to the display screen,
   wherein the first processor is further configured to control which of the first processor and the second processor controls the switch circuitry to the first state or the second state.

6. The communication device of claim 1, further comprising switch circuitry communicatively coupled with the first processor, the second processor, and the display screen, wherein the switch circuitry is configured to:
   in a first state, relay the first graphic interface from the first processor to the display screen; and
   in a second state, relay the second graphic interface from the second processor to the display screen,
   wherein the first processor is further configured to:
      initially control the switch circuitry to the first state;
      control the display screen to provide the first graphic user interface by communicating with the display screen via the switch circuitry; and
      hand off control of the display screen to the second processor by handing off control of the switch circuitry to the second processor, and
   wherein the second processor is further configured to, after being provided with control of the switch circuitry:
      control the switch circuitry to the second state; and
      control the display screen to provide the second graphic user interface by communicating with the display screen via the switch circuitry.

7. The communication device of claim 1, further comprising display-reset control circuitry configured to:
   reset the display screen prior to the first processor controlling the display screen to provide the first graphic user interface; and
   reset the display screen prior to the second processor controlling the display screen to provide the second graphic user interface.

8. The communication device of claim 1, further comprising display-reset control circuitry configured to:
   reset the display screen prior to the first processor controlling the display screen to provide the first graphic user interface; and
   reset the display screen prior to the second processor controlling the display screen to provide the second graphic user interface,
   wherein the first processor is further configured to control the display-reset control circuitry to reset the display screen prior to controlling the display screen to provide the first graphic user interface, and
   wherein the second processor is further configured to control the display-reset control circuitry to reset the display screen prior to controlling the display screen to provide the second graphic user interface.

9. The communication device of claim 1, wherein the first processor is further configured to provide the radio functionality associated with the communication interface after the first power-up time.

10. The communication device of claim 1, wherein the communication interface-related information comprises an indication of one or more of:
    a channel on which the communication interface is communicating;
    a zone of the channel; and
    a volume associated with the channel.

11. The communication device of claim 1, wherein the information associated with the extended functionality comprises an indication of one or more of:
    operating system functionality of an operating system implemented by the second processor;
    messaging functionality of a messaging application implemented by the second processor; and
    functionality of any other applications implemented by the second processor.

12. The communication device of claim 1, further comprising an on-switch, and the first power-up time and the second power-up time begin after the on-switch is actuated to an on-state.

13. The communication device of claim 1, wherein the second processor is further configured to, when the second processor crashes and needs to again power up:
    hand off control of the display screen to the first processor, such that the first processor again controls the display screen to provide the first graphic user interface, while the second processor again powers up according to the second power-up time, and
    wherein the first processor is configured to again hand off control of the display screen to the second processor after the second processor again powers up according to the second power-up time.

14. The communication device of claim 1, further comprising one or more input devices,
    wherein the second processor is further configured to:
       enter a sleep state when sleep conditions are met at the second processor, the second processor powering down for the sleep state;
       hand off control of the display screen to the first processor prior to entering the sleep state, such that the first processor again controls the display screen to provide the first graphic user interface during the sleep state; and
       power up according to the second power-up time when a wake condition is detected via the one or more input devices, and
    wherein the first processor is configured to again hand off control of the display screen to the second processor after the second processor again powers up according to the second power-up time.

15. A method comprising:
    a first processor of a communication device, after first power-up time of the first processor controlling a display screen of the communication device to provide a first graphic user interface programmed to display communication interface-related information and a power-up status of a second processor of the communication device, the first processor configured to power up according to the first power-up time, the first processor for implementing radio functionality associated with a communication interface of the communication interface, and the second processor configured to power up according to a second power-up time longer than the first power-up time, the second processor for implementing extended functionality as compared to the first processor;

the first processor, after the second power-up time, handing off control of the display screen to the second processor; and the second processor, after being provided with control of the display screen, controlling the display screen to provide a second graphic user interface programmed to display the communication interface-related information and information associated with the extended functionality, wherein the communication device further comprises a communication bus, wherein the first processor and the second processor are further configured to communicate with each other via the communication bus, and the method further comprises: the second processor, during the second power-up time: providing the power-up status of the second processor to the first processor via the communication bus.

16. The method of claim 15, wherein the display screen comprises a touch screen, the touch screen being disabled during the first power-up time, and further comprising:

enabling, via the second processor, the touch screen, after the second processor is provided with control of the display screen.

17. The method of claim 1, further comprising one or more of:

the first processor, after the second power-up time: providing the communication interface-related information to the second processor via the communication bus; and the second processor, after the second power-up time: providing a ready indication to the first processor via the communication bus, and the first processor is handing off control of the display screen to the second processor, after the second power-up time, upon receipt of the ready indication.

18. The method of claim 15, further comprising:

the first processor resetting the display screen prior to controlling the display screen to provide the first graphic user interface; and the second processor resetting the display screen prior to controlling the display screen to provide the second graphic user interface.

19. The method of claim 15, wherein the communication interface-related information comprises an indication of one or more of: a channel on which the communication interface is communicating: a zone of the channel; and a volume associated with the channel, and wherein the information associated with the extended functionality comprises a respective indication of one or more of: operating system functionality of an operating system implemented by the second processor; messaging functionality of a messaging application implemented by the second processor; and functionality of any other applications implemented by the second processor.

20. A communication device comprising:
a communication interface;
a display screen;
display-reset control circuitry;
a first processor configured to power up according to a first power-up time, the first processor for implementing radio functionality associated with the communication interface; and
a second processor configured to power up according to a second power-up time longer than the first power-up time, the second processor for implementing extended functionality as compared to the first processor,
the first processor further configured to, after the first power-up time:
control the display screen to provide a first graphic user interface programmed to display communication interface-related information and a power-up status of the second processor; and
after the second power-up time, hand off control of the display screen to the second processor; and
the second processor further configured to, after being provided with control of the display screen:
control the display screen to provide a second graphic user interface programmed to display the communication interface-related information and information associated with the extended functionality; and
the display-reset control circuitry configured to:
reset the display screen prior to the first processor controlling the display screen to provide the first graphic user interface; and
reset the display screen prior to the second processor controlling the display screen to provide the second graphic user interface.

21. A method comprising:
a first processor of a communication device, after first power-up time of the first processor controlling a display screen of the communication device to provide a first graphic user interface programmed to display communication interface-related information and a power-up status of a second processor of the communication device, the first processor configured to power up according to the first power-up time, the first processor for implementing radio functionality associated with a communication interface of the communication interface, and the second processor configured to power up according to a second power-up time longer than the first power-up time, the second processor for implementing extended functionality as compared to the first processor;
the first processor, after the second power-up time, handing off control of the display screen to the second processor;
the second processor, after being provided with control of the display screen, controlling the display screen to provide a second graphic user interface programmed to display the communication interface-related information and information associated with the extended functionality;
the first processor resetting the display screen prior to controlling the display screen to provide the first graphic user interface; and
the second processor resetting the display screen prior to controlling the display screen to provide the second graphic user interface.

* * * * *